United States Patent
Horst et al.

(10) Patent No.: US 9,904,823 B2
(45) Date of Patent: Feb. 27, 2018

(54) ANTENNA FOR A READ/WRITE UNIT FOR RADIO FREQUENCY IDENTIFICATION (RFID) ARRANGEMENTS, AND READ/WRITE UNIT FOR OPERATION WITH AN EXTERNAL ANTENNA

(71) Applicants: Dieter Horst, Cadolzburg (DE); Lukas Walter Mayer, Vienna (AT); Leopold Resel, Vienna (AT); Martin Schiefer, Vienna (AT)

(72) Inventors: Dieter Horst, Cadolzburg (DE); Lukas Walter Mayer, Vienna (AT); Leopold Resel, Vienna (AT); Martin Schiefer, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 821 days.

(21) Appl. No.: 14/032,514

(22) Filed: Sep. 20, 2013

(65) Prior Publication Data
US 2014/0085057 A1    Mar. 27, 2014

(30) Foreign Application Priority Data
Sep. 21, 2012   (EP) .................................... 12185408

(51) Int. Cl.
*H04Q 5/22* (2006.01)
*G06K 7/10* (2006.01)
*H01Q 1/22* (2006.01)

(52) U.S. Cl.
CPC ....... *G06K 7/10316* (2013.01); *H01Q 1/2216* (2013.01)

(58) Field of Classification Search
None
See application file for complete search history.

(56) References Cited

U.S. PATENT DOCUMENTS

| | | | | |
|---|---|---|---|---|
| 4,641,304 A | * | 2/1987 | Raychaudhuri .... | H04B 7/18528 370/447 |
| 5,590,415 A | * | 12/1996 | Peltola ................... | G01R 27/06 455/103 |
| 6,000,845 A | * | 12/1999 | Tymkewicz ........... | G01K 1/146 374/155 |
| 7,333,060 B2 | * | 2/2008 | Ando .................. | H01Q 1/2216 343/700 MS |

(Continued)

FOREIGN PATENT DOCUMENTS

| | | |
|---|---|---|
| CN | 102483797 | 5/2012 |
| DE | 102009045186 A1 | 4/2011 |
| JP | 2011139342 A | 7/2011 |

*Primary Examiner* — Curtis King
(74) *Attorney, Agent, or Firm* — Cozen O'Connor

(57) ABSTRACT

An antenna, a read/write unit, an radio frequency identification (RFID) arrangement and a method, wherein the antenna is configured to connect to an external antenna connection of the read/write unit via an antenna line, wherein the antenna includes a data memory having type information and/or having property information, the content of the data memory being readable by the read/write unit, and includes a measuring device for determining a value of the field strength or power of a radio frequency signal fed into the antenna by the read/write unit, and includes a device for informing the read/write unit about the value being reached or exceeded.

17 Claims, 4 Drawing Sheets

(56) References Cited

U.S. PATENT DOCUMENTS

| | | | |
|---|---|---|---|
| 7,468,696 B2* | 12/2008 | Bornholdt | G01S 5/14 342/387 |
| 2002/0074666 A1* | 6/2002 | Usami | H01L 23/544 257/774 |
| 2004/0212493 A1 | 10/2004 | Stilp | |
| 2004/0257284 A1* | 12/2004 | Rada | H01Q 1/241 343/702 |
| 2005/0068157 A1* | 3/2005 | Elliott | G06K 19/0723 340/10.34 |
| 2005/0181732 A1* | 8/2005 | Kang | H04B 17/309 455/67.11 |
| 2006/0014503 A1* | 1/2006 | Theobold | G01R 29/0878 455/126 |
| 2006/0066443 A1* | 3/2006 | Hall | G06K 7/10316 340/10.5 |
| 2006/0164251 A1* | 7/2006 | Meyers | G06K 7/10316 340/572.8 |
| 2007/0194900 A1* | 8/2007 | Hawkins | B60N 2/002 340/457.1 |
| 2008/0084290 A1* | 4/2008 | Hawkins | B60R 21/0152 340/457.1 |
| 2008/0129509 A1 | 6/2008 | Duron | |
| 2009/0027282 A1* | 1/2009 | Finn | H04B 1/18 343/703 |
| 2009/0290563 A1* | 11/2009 | Gu | H04B 7/0608 370/338 |
| 2010/0259367 A1* | 10/2010 | Kung | G06K 7/0095 340/10.3 |
| 2010/0323650 A1* | 12/2010 | Egawa | H04B 1/18 455/193.1 |
| 2012/0021790 A1* | 1/2012 | Kister | H04B 1/18 455/507 |
| 2012/0075073 A1 | 3/2012 | Fislage | |
| 2012/0239294 A1* | 9/2012 | Stahlin | H04L 67/12 701/484 |
| 2013/0169416 A1* | 7/2013 | Rezayee | G06K 7/10009 340/10.1 |
| 2013/0222119 A1 | 8/2013 | Tietke et al. | |
| 2013/0281036 A1* | 10/2013 | Kolokotronis | H01Q 1/246 455/115.1 |
| 2014/0065982 A1* | 3/2014 | Suh | H04B 1/006 455/77 |
| 2015/0172938 A1* | 6/2015 | Lehtinen | H04B 1/54 455/77 |
| 2015/0177293 A1* | 6/2015 | McFarthing | G01R 21/06 340/870.3 |
| 2016/0050032 A1* | 2/2016 | Emerson | H04B 17/102 455/115.2 |
| 2016/0126619 A1* | 5/2016 | Tenbroek | H01Q 1/50 343/745 |

\* cited by examiner

ANTENNA FOR A READ/WRITE UNIT FOR RADIO FREQUENCY IDENTIFICATION (RFID) ARRANGEMENTS, AND READ/WRITE UNIT FOR OPERATION WITH AN EXTERNAL ANTENNA

BACKGROUND OF THE INVENTION

1. Field of the Invention

The invention relates to an antenna for a read/write unit for Radio Frequency Identification (RFID) arrangements, a read/write unit for RFID arrangements, a system comprising a read/write unit for RFID arrangements and an external antenna, and a method for matching the read/write unit for RFID arrangements to an external antenna.

2. Description of the Related Art

Read/write units for Radio Frequency Identification (RFID) arrangements, such as in the Ultra High Frequency (UHF) band, are frequently operated with external antennas, particularly in the case of arrangements in which an internal antenna alone is not sufficient for covering a required radio area. For example, it is possible to equip a loading door in logistics with four antennas for the purpose of better radio coverage, all four antennas being connected to a single read/write unit ("Reader"), where alternate operation of the various antennas is implemented in the read/write unit via a changeover matrix, for example.

At least when the RFID arrangement, i.e., the read/write unit and the antennas, is installed for the first time, a user needs to carefully parameterize the antenna lines and antennas used in the read/write unit when configuring the read/write unit. For example, it is necessary to reduce the maximum transmission power as the antenna gain rises, in order to comply with legal requirements. On the other hand, in the case of antenna lines or in the case of connections between the radio-frequency circuit of the read/write unit and the radiation element of the antenna, losses may arise, depending on the damping and depending on the adjustment (e.g., reflection factor), which can or are permitted to be compensated for by a higher transmission power for the read/write unit. Only exact configuration of the read/write unit in respect of the type or properties of the antenna used and the properties of the antenna line (cable) used results in the desired or permitted radiation power and, on the other hand, a misconfiguration, such as cable damping which is set too high, may possibly result in the permissible radiation power being exceeded.

To configure a read/write unit with respect to "antenna configuration", it is necessary to manually input, for each "antenna port" used, i.e., for each antenna connection, what line parameters (e.g., cable damping) and what antenna (type or antenna gain) are used. Firstly, this is complicated for a user, because he may need to look up what values need to be set in manuals, tables or the like, and secondly legal requirements may be infringed or else malfunctions may occur as a result of incorrect inputs. In addition, there is the danger of the configuration not being adjusted when the operating frequency is changed, when an antenna is replaced or when an antenna line is replaced, as a result of which faults or impermissible operating states can likewise occur.

SUMMARY OF THE INVENTION

It is therefore an object of the present invention to simplify the configuration of read/write units for Radio Frequency Identification (RFID) arrangements with respect to the antennas and antenna lines used.

This and other objects and arrangement are achieved in accordance with the invention by providing the antennas that are provided for the RFID arrangements with a data memory that can be read by read/write units, where the data memory contains information about the type of the antenna or the technical properties of the antennas (e.g., the antenna gain). In accordance with the invention, the antenna is configured such that it ensures configuration of at least the maximum transmission power of the read/write unit regardless of the antenna line used or the technical properties thereof (e.g., damping). To this end, the invention provides for a radio-frequency signal that is fed into the antenna by the read/write unit via the antenna line to result in the antenna being appropriately reported to the read/write unit, at least in the event of a limit value or threshold value being reached or exceeded, as a result of which the read/write unit is rendered able to identify or compensate for power losses or the like.

It is also an object of the invention to provide an antenna for a read/write unit for RFID arrangements, where the antenna is configured to connect to an external antenna connection of the read/write unit via an antenna line. Here, the antenna is equipped with a data memory having type information and/or having property information, where the content of the data memory is readable by the read/write unit, and where the antenna has a measuring device for determining at least one value of the field strength or power of a radio-frequency signal that is fed into the antenna by the read/write unit. In addition, the antenna includes means for informing the read/write unit about the at least one value being reached or exceeded. Such an antenna can achieve what is known as a "plug-and-play" solution, in which a user does not need to configure any parameters on the read/write unit that relate to the antenna or the antenna line. Furthermore, such an antenna can be used with a read/write unit having hardware equipment that can correspond to the prior art hardware equipment; at all events at firmware level or at application level, a read/write unit needs to be configured for automatic configuration with the antenna according to the invention.

It is also an object to provide a read/write unit for RFID arrangements, where the read/write unit is configured to adjust a transmission power and/or to determine a maximum transmission power based on the type or of properties of the antenna used and based on the damping of an antenna line that is used. In this case, the read/write unit is configured to read a piece of type or property information from the antenna and to automatically take into account the damping by receiving a piece of information about at least one value for the field strength or power of a radio-frequency signal received in the antenna from the read/write unit being reached or exceeded and to relate this at least one value to a relative or absolute value for the radio-frequency signal that is output by the read/write unit in the process. In addition, the read/write unit is configured to ascertain the maximum transmission power, or a transmission power that is to be used, from the type or property information and from the relationship between the power of the output radio-frequency signal and the information about the at least one value. Such a read/write unit is able, in conjunction with an appropriately designed antenna, to automatically configure the antenna and line parameters.

It is also an object of the invention to provide a system comprising a read/write unit for RFID arrangements and an external antenna that is connected via a connecting line, where the system is configured to automatically match the read/write unit to the antenna and the antenna line that is used. Here, the system is formed from the previously described read/write unit and the previously described antenna. Such a system allows automatic configuration of the antenna and line parameters in the read/write unit.

It is also an object of the invention to provide a method for matching a read/write unit for RFID arrangements to an external antenna that is connected via a connecting line. Here, the read/write unit reads at least one piece of type information and/or at least one piece of property information from the antenna, where the read/write unit outputs at least one radio-frequency signal and feeds it into the antenna, where the antenna transmits a piece of information about at least one value of the radio-frequency signal captured in the antenna being reached or exceeded to the read/write unit, and where the read/write unit uses the piece of type information and/or the property information from the antenna and uses the relationship between the relative or absolute output power and the at least one value to make an adjustment, particularly for a maximum transmission power. Such a method allows automatic antenna and line configuration in read/write units in RFID arrangements.

Advantageous embodiment of the antenna according to the invention are specified herein. The features and advantages described in this context also apply mutatis mutandis to the read/write unit according to the invention, the system according to the invention and the method according to the invention. The advantageous embodiments described in this context may be implemented either individually or in combination with one another. In particular, it is possible that, in the case of read/write units having a plurality of antenna connections (antenna ports, ports), a different automatic configuration method is used for each antenna connection and a different antenna (different antenna type, different configuration type) and different connecting lines are used on each of these antenna connections.

Advantageously, the antenna uses the communication method of "modulated backscattering" based on an RFID protocol for transmitting the content of the data memory and for informing the read/write unit about the at least one value being reached or exceeded, the effect achieved being that it is not necessary to implement a further, separate communication protocol for the read/write unit used. The method of "modulated backscattering" is also called "backscattering" or "load modulation" in the field of RFID technology.

A particularly simple embodiment, in which it is possible to dispense with the use of a separate power threshold switch or a separate power measuring device, is obtained when the value used is a response threshold (activation threshold, "wake-up level") of a data memory, such as an RFID transponder, in which the information to be transmitted is kept for retrieval. However, more precise detection of the value can be achieved by virtue of the antenna having a power sensor as a measuring device, which power sensor is coupled to a radio-frequency line or to a radiation element and is configured and connected up such that the data memory or the transmission of the information is activated when a minimum value of the field strength or of the power (field strength or power that is fed into the antenna by the read/write unit) is reached or exceeded, where the minimum power can be used as the at least one value. In this alternative embodiment, a scatter or a temperature dependency for the response threshold of the RFID transponder is no longer an issue.

In both cited embodiments, the at least one value, i.e., the activation value of the power detector or the response threshold of the RFID transponder, may advantageously be stored in the data memory, or else alternatively may be obtained from a piece of type information that is stored in the data memory, for example, using access to tables or databases. It is also possible to store response values for different frequencies or temperatures.

As an alternative to the transmission of the information by means of an RFID protocol, the antenna can use a low-frequency signal that is modulated onto the antenna line for transmitting the content of the data memory and for informing the read/write unit about the at least one value being reached or exceeded, such as in a manner similar to the DiSEqC method from satellite antenna engineering. This has the advantage that no RFID transponders and no RFID serial numbers need to be kept for the calibration method. It is also possible for the activation of the data memory or the transmission of the information to be initiated in the same way.

In one advantageous, alternative embodiment, the antenna is configured to transmit the content of the data memory and to inform the read/write unit about the at least one value being reached or exceeded by clocked shorting of the antenna line, where the clocked shorting allows bit-by-bit transmission of the information that is to be transmitted. This has the advantage that during the periods in which a short circuit is produced it is possible for an appropriately equipped read/write unit to measure further line parameters, for example the cable damping, or reflection losses, which occur on the antenna.

In order to ensure fault-free operative running, the data memory and/or the measuring device can advantageously be activated and deactivated by a signal received via the antenna line or by a DC voltage that is present on the antenna line.

Advantageously, the antenna has a control device, particularly a microcontroller or a similar programmable circuit, where the control device is configured to transmit the content of the data memory and at least one absolute value for the field strength or power, which absolute value is respectively measured by the measuring device, to the read/write unit. Hence, the information to be transmitted can be set flexibly, and furthermore it is also possible for further measured variables, for example a temperature measured value, to be captured and transmitted. In this case, the control device advantageously comprises the data memory or provides it.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of an antenna according to the invention are explained below with reference to the drawings. They are used to explain exemplary embodiments of read/write units according to the invention, systems comprising read/write units and antennas and also exemplary embodiments of methods according to the invention simultaneously, in which.

DETAILED DESCRIPTION OF THE PRESENTLY EMBODIMENTS

The methods and arrangements outlined below are based on the problem of an antenna needing to be connected to an RFID read/write unit using a coaxial cable as an antenna line, the read/write unit being intended to determine the antenna type or the technical properties of the antenna automatically, and furthermore the cable damping or the (maximum permitted) transmission power of the antenna needing to be automatically ascertained for the read/write unit, specifically by virtue of the information about the antenna type/antenna properties and the information about the cable damping or the available radio-frequency power that is present in the antenna at a given transmission power. In this case, it is necessary to ensure that, for example, Equivalent Isotropically Radiated Power (EIRP) is not exceeded.

Unless stated otherwise, the reference symbols subsequently introduced with the figures each also apply to subsequent figures and, therein, each denote devices that are the same or have similar functions. They are therefore not introduced again for subsequent figures.

Figure 1:
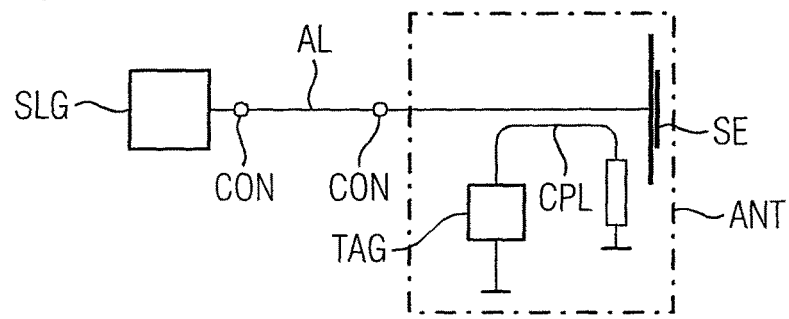
FIG. 1 shows a first embodiment of an arrangement comprising a read/write unit and an antenna in accordance with the invention.

FIG. 1 schematically shows an arrangement (i.e., system) comprising a read/write unit SLG and an antenna ANT, which are connected to one another by a connecting line AL (e.g., coaxial cable) that is connected to connectors CON. As an essential functional element, the antenna has a radiation element SE at which the radio-frequency signals are radiated and received. The radiation element SE, or emitter for short, is based on the prior art and may correspond to a "patch antenna" (planar emitter), for example. In this regard, the RF properties of the dedicated antenna ANT, correspond to those of a conventional antenna.

An internal radio-frequency line, such as a conductor track on a printed circuit board, has an RFID transponder chip TAG (or transponder chip for short) coupled to it by a coupler CPL as a data memory.

Instead of the coupler CPL shown here (i.e., directional coupler), it is also possible to select a power divider or a similar connection for the RFID transponder to the radio-frequency path of the antenna ANT. Furthermore, instead of the coupling to a radio-frequency line inside the antenna ANT, it is also possible for coupling to the radiation element SE to be effected.

The RFID transponder TAG, i.e., the data memory, stores type information and/or technical information about the properties of the antenna ANT and specifically about the properties of the radiation element SE. More specifically, this involves the specification of a type designation, for example ANT-0815, and of a measure for the antenna gain, for example 3 dBi. Besides this "basic information", there may also be further technical parameters and further type information stored in the data memory. For example, the data may be stored in tabular form based on parameters such as operating frequency and temperature. In particular, it is also possible for just a type designation or just technical properties to be stored, and in the former case an external information memory, such as an Internet-based database or a configuration file for read/write units SLG, can have the technical properties of the antenna, particularly the antenna gain, determined in it from the stored type information.

The RFID transponder is configured such that it is "compatible" with the read/write unit SLG that is used, i.e., it can be read by this appliance. In order to automatically configure the antenna in the read/write unit SLG, the read/write unit SLG begins with capture cycles ("Inventories"), where a modulated radio-frequency carrier wave ("polling message") is periodically transmitted based on the RFID protocol used. Optionally, such a polling message can specify a respective identification number or an identification number range for such RFID transponders TAG as are provided for "responding" to the polling cycles. A prerequisite of this embodiment is that the RFID transponders provided for antennas ANT each have a particular identification number or belong to a particular range (group of numbers) of identification numbers. This makes it possible to ensure that the RFID transponder TAG used for the configuration no longer responds to further capture cycles and hence disrupts productive operation during later operation in progress.

The read/write unit SLG begins the progressive polling cycles at a very low, minimum transmission power. This transmission power is successively increased upon subsequent polling cycles. As soon as the radio-frequency power introduced into the RFID transponder TAG via the coupler CPL is sufficient for operation of the transponder TAG ("wake-up"), the transponder TAG responds, as a result of which its data memory with the information, i.e., type information and/or property information, is read by the read/write unit SLG. This "response threshold", the level of which, in one advantageous embodiment, is stored in the RFID transponder TAG (transponder chip) as a further piece of information or can be ascertained from a piece of type information and hence can be transmitted to the read/write unit, can be related by the read/write unit to the transmission power used during the first successful capture cycle. The radio-frequency power radiated or output in the process can then be used either as an absolute value (e.g., 5 mW) or as a relative value (e.g., 25%) from a nominal value. Similarly, the "response threshold" of the RFID transponder TAG may be an absolute value (e.g., 2 mW) or a relative value (e.g., 30%), in which case the relative value relates to a standard-definition maximum radiation power (EIRP) for an antenna with a gain of 0 dBi, where the antenna gain needs to be taken into account as a piece of information retrieved from the antenna from the read/write unit SLG for ascertaining the maximum possible or permitted transmission power.

Uncertainty in the coupling loss of the coupler CPL with the RFID transponder TAG and scattering of the "response threshold" of the RFID circuit can (if necessary) be calibrated in advance. Such calibration data can, following a factory test on the antenna ANT, be stored directly in the transponder TAG and are then available to any read/write unit SLG. For the coupling element CPL, coupling losses in the order of magnitude of 30 dB are advantageous in practice. In principle, this value is dependent on the maximum transmission power of the read/write unit SLG, the "destruction limit" of the chip of the transponder TAG and on the "dynamic range" of the RF output stage of the read/write unit SLG. High coupling loss means that the terminating resistor in the "chip" of the transponder TAG has no significant influence on the later productive operation of the RFID system.

The RFID transponder TAG can be switched to "Silent" during the following transactions in operative mode in the radio field of the antenna ANT so as not to disrupt normal operation of the read/write unit SLG. As has already been outlined, this can be accomplished by reserving a group of numbers comprising RFID serial numbers ("IDs"), for example.

Figure 2:
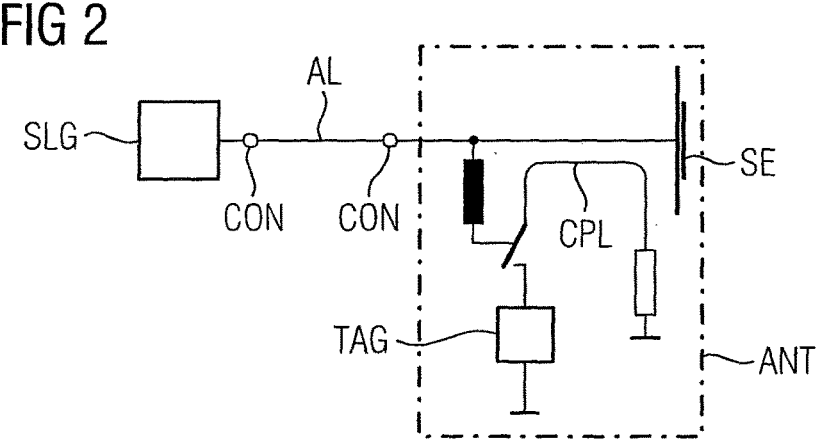
FIG. 2 shows a second embodiment of an arrangement comprising a read/write unit and an antenna according in accordance with the invention.

An alternative embodiment for switching the data memory on and off is shown in FIG. 2. In this case, a DC voltage impressed on the connecting line AL or the antenna connection by the read/write unit SLG, or another electrical signal, can be used to connect the "chip" of the transponder TAG to the coupler CPL via a semiconductor switch only when identification and power calibration are necessary. When the "calibration" has been performed, the transmission power can then be set relative to the "wake-up power" or "response threshold". The arrangement shown cannot be used to compensate for a temperature-related fluctuation in the response threshold. However, this temperature compensation can be accomplished by equipping the circuits shown with a temperature sensor or with a temperature compensation circuit, where applicable.

Figure 3:
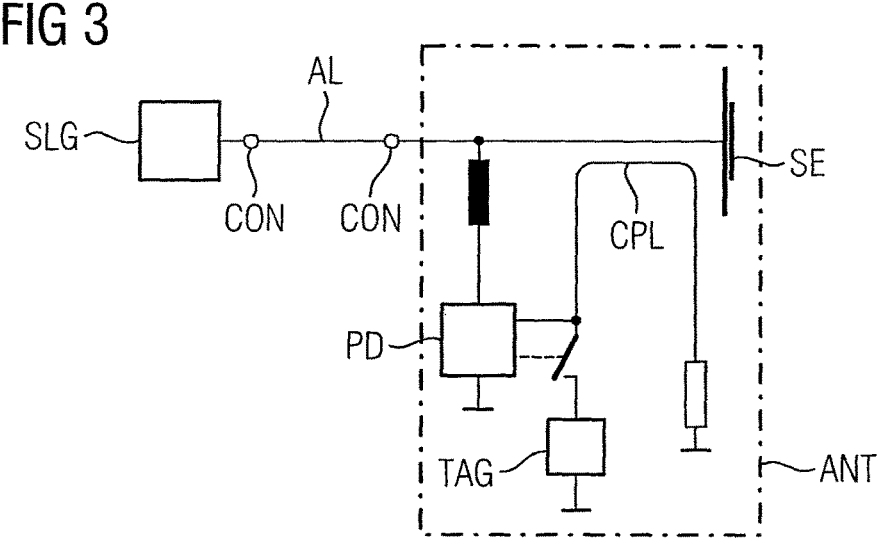
FIG. 3 shows a third embodiment of an arrangement comprising a read/write unit and an antenna in accordance with the invention.

As described, the use of an RFID transponder TAG with a measured or known response threshold (activation threshold, activation power) represents a measuring device that can be used to establish when a transmission power or field strength is exceeded at the location of or within the antenna ANT as a value for the calibration. Owing to the already discussed temperature dependency as a result of any production discrepancies and other imponderabilities, this response threshold is changeable and "erroneous", however. FIG. 3 therefore shows an alternative embodiment of the antenna ANT according to the invention, where the circuit known from FIG. 2 has been complemented by a power detector PD that is supplied with power by a DC voltage that is impressed on the transmission line, for example. Such a DC voltage can also be implemented in read/write units SLG from the prior art by connecting a feed separating filter, the power (DC voltage) required for this purpose being able to be taken from a digital output of a read/write unit SLG, for example. The presently contemplated embodiment also has the advantage that a piece of software in the read/write unit SLG can be used to switch the "calibration mode" of the antenna ANT on and off.

The circuit indicated in FIG. 3 with the power detector PD can achieve a higher level of precision and lower scatter, in comparison with the dependency of the method on the "response threshold" of the RFID transponder TAG. Even temperature compensation using a temperature measurement is possible directly in the detector circuit in this case. Care should be taken to ensure that the power threshold at which the "chip" of the transponder TAG is connected to the coupling element CPL is distinctly higher than the wake-up power (response threshold) of the "chip" itself. In this case, it is possible for the antenna to also be identified by conventional reading of the "chip" of the RFID transponder TAG, with the electronic circuit becoming inactive, and therefore no longer influencing operative running of the read/write unit SLG, when the DC voltage is switched off.

Figure 4:
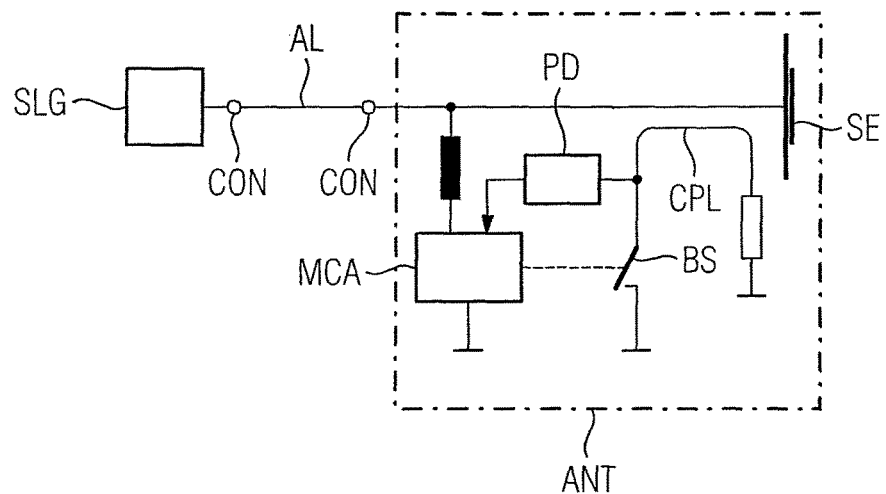
FIG. 4 shows a fourth embodiment of an arrangement comprising a read/write unit and an antenna in accordance with the invention.

An alternative embodiment to the latter arrangement is shown in FIG. 4. Instead of an RFID transponder TAG, a microcontroller MCA is used in this case, which operates an electronic switch BS ("Backscatter Switch"). In this arrangement, the microcontroller MCA can read power data from the power detector PD, which is coupled to a radio-frequency path of the antenna ANT via the coupler CPL. In the case of this circuit, the microcontroller MCA "simulates" an RFID transponder TAG, as has already been described in connection with the preceding figures, with the electronic switch BS for modulated backscattering. Instead of exceeding a threshold, which naturally requires a multiplicity of polling cycles with respective gradually increased transmission power, a DC voltage impressed on the connecting line is in this case used to supply power to the circuit shown, where the microcontroller MCA is used to transmit the absolutely measured transmission power, the antenna characteristic data ("antenna properties") and also other measured variables (e.g., the temperature) to the read/write unit SLG. A particularly advantageous solution for the data transmission from the antenna ANT to the read/write unit SLG can be regarded as the implementation of a piece of software in the microcontroller MCA that allows data interchange in a manner similar to the "productively" used RFID transponders using the RFID protocol that is used by the read/write unit SLG. Hence, the read/write unit SLG can read the present "incoming" transmission power and the antenna data in the same manner in which it would read stored data from other RFID transponders. Therefore, it is not necessary to implement a separate, different communication protocol in the read/write unit SLG. By switching off the DC voltage or by transmitting a separate command, it is possible for the measuring circuit shown to be isolated from the antenna port or from another portion of the radio-frequency path of the antenna ANT so as not to influence operative running. The microcontroller MCA can also be used to store calibration data for the power detector PD, and it is also possible for a temperature measurement, which can also occur in the microcontroller MCA, to be used to implement temperature compensation. Thus, the instantaneous transmission power available in the antenna ANT can be ascertained with a high level of measurement accuracy. It is also conceivable for the angle of inclination and the orientation (e.g., horizontal or vertical) of the antenna to be requested by linking an electronic acceleration sensor to the microcontroller MCA.

Figure 5:
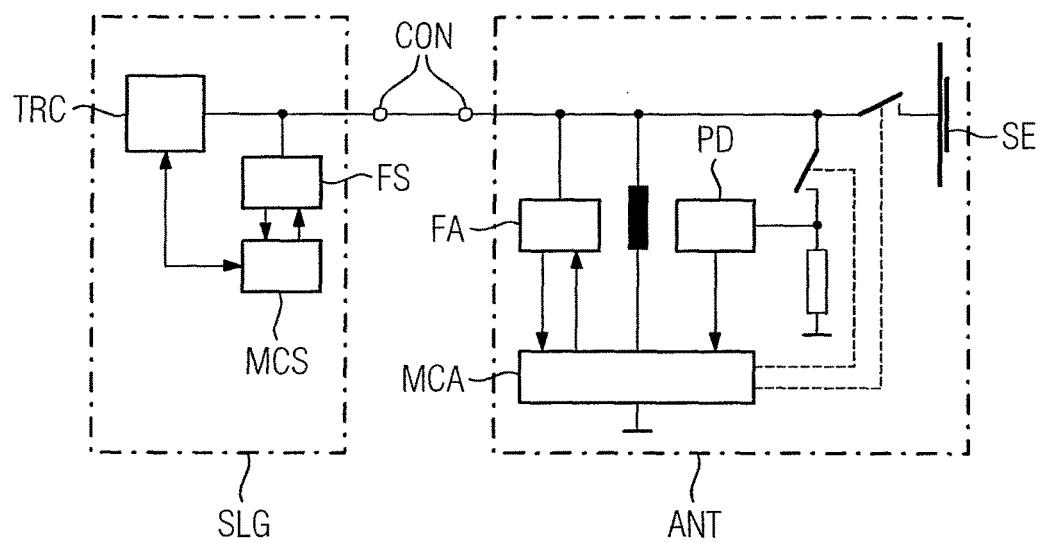
FIG. 5 shows a fifth embodiment of an arrangement comprising an alternate embodiment of the read/write unit and an antenna in accordance with the invention.
Figure 6:
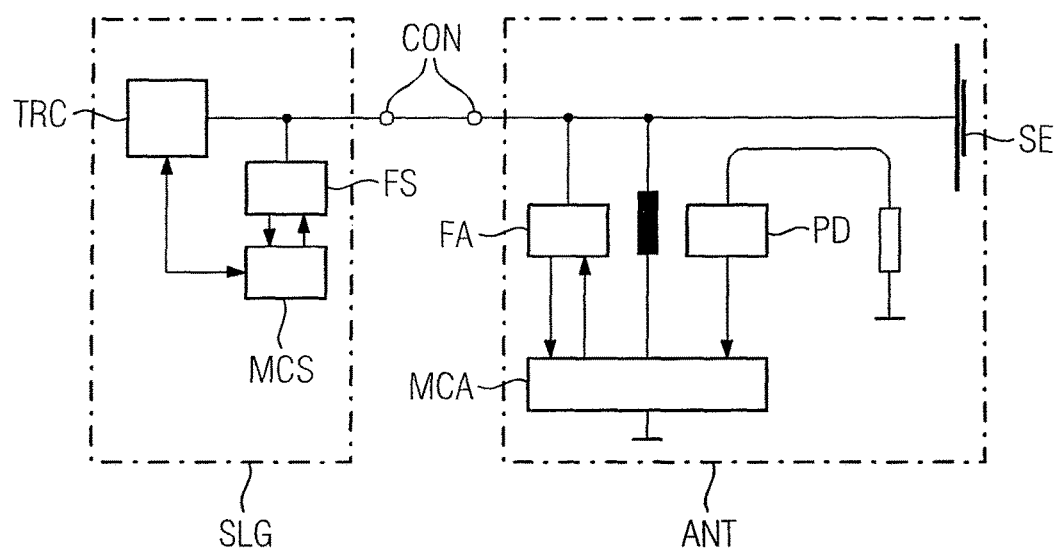
FIG. 6 shows a sixth embodiment of an arrangement comprising the alternative embodiment of the read/write unit and an antenna in accordance with the invention.

As a departure from the read/write unit SLG from the preceding figures, FIGS. 5 and 6 each show an embodiment in which the read/write unit SLG is extended by a microcontroller MCA and a filter circuit FS ("frequency separating filter") besides the radio-frequency chip TRC ("Transceiver") that is present as standard. Similarly, although the antenna ANT shown in FIGS. 5 and 6 contains a microcontroller MCA, like the antenna ANT from the preceding exemplary embodiment, this microcontroller is linked to the radio-frequency line within the antenna ANT by a filter circuit FA. In contrast to the preceding examples, the antenna ANT communicates with the read/write unit SLG not via an RFID communication protocol, and hence by radio frequency, but rather via signals that are modulated onto a DC voltage. In many aspects, this principle is based on a method from satellite antenna engineering (DiSEqC protocol).

In the exemplary embodiment shown in FIG. 5, the radiation element SE of the antenna ANT is isolated, under the control of the microcontroller MCA, by an (electronic) switch, as a result of which the line is terminated internally by its characteristic impedance (in this case: 50Ω). This allows a very high level of accuracy for the subsequent power measurement of the power detector PD, because the influence of the radiation element SE is reliably eliminated.

FIG. 6 shows a similar circuit, but in this case the decoupling is effected by a directional coupler CPL, in a similar manner to the approach in FIGS. 1 to 4. With good "directional acuity" in the coupler CPL and sufficiently precise antenna matching, the power can be determined with sufficient accuracy in this case too. The actual method for obtaining measured values for matching the read/write unit SLG to the specifically used antenna ANT is in this case similar to the approaches to a solution that have been discussed above. Appropriate commands place the circuit in the antenna ANT into an operating state in which the radio-frequency power "received" via the antenna line AL and also the "identification" or the technical parameters of the antenna ANT are transmitted to the read/write unit SLG. This allows the necessary transmission power for reaching a desired radiation power (EIRP) to be set in the read/write unit SLG. In this case, the microcontroller MCA keeps the calibration data for the power detector PD and also the identification data or the technical parameters for the antenna ANT for retrieval. The filters FA, FS are used to transmit the data in modulated form from the microcontroller MCA to the microcontroller MCS in this case, and the latter makes them available to a calibration routine in the read/write unit SLG.

Figure 7:
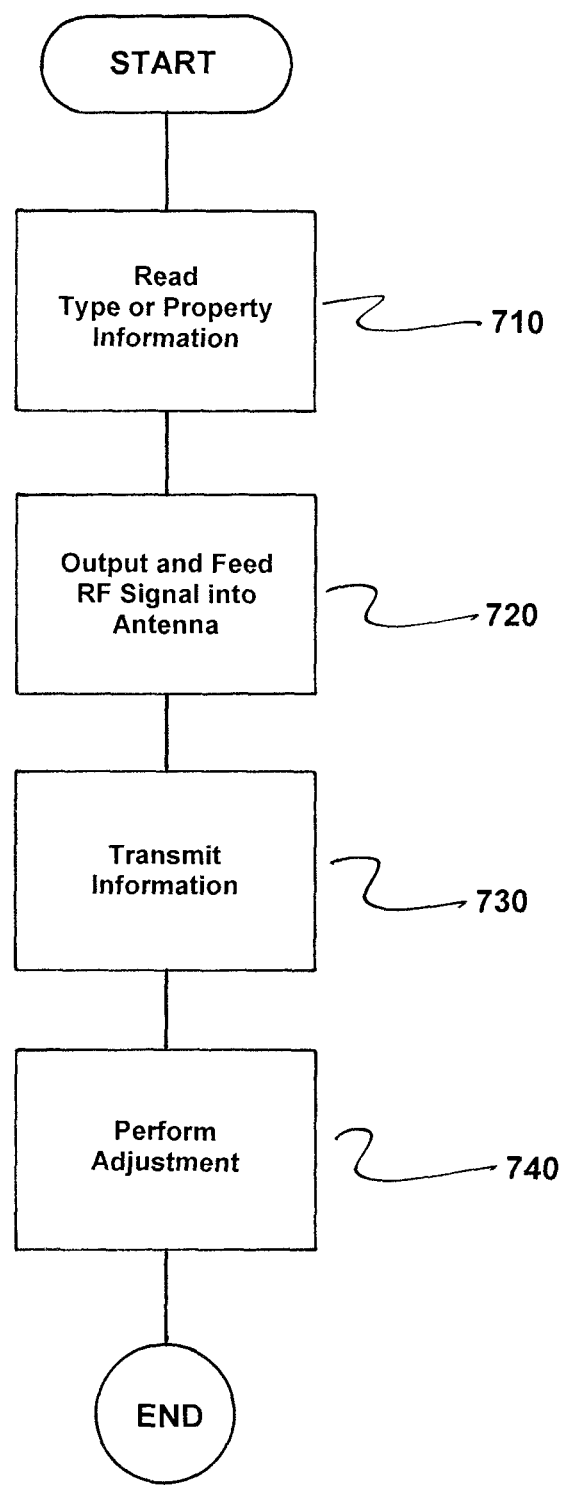
FIG. 7 is a flowchart in accordance with the invention.

FIG. 7 is a flowchart of a method for matching a read/write unit for radio frequency identification arrangements to an external antenna that is connected via a connecting line. The method comprises reading, by the read/write unit, at least one of a piece of type information and property information from the antenna, as indicated in step 710.

Next, at least one radio-frequency signal is output by the read/write unit and the at least one radio-frequency signal is fed into the antenna, as indicated in step 720. A piece of information about at least one value of the radio-frequency signal captured in the antenna being reached or exceeded is now transmitted by the antenna to the read/write unit, as, as indicated in step 730.

The piece of type information and/or the property information from the antenna is utilized by the read/write unit, and utilizing a relationship between a relative or absolute output power and the at least one value is also utilized by the read/write unit to perform an adjustment to achieve maximum transmission power, as indicated in step 740.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An antenna for a read/write unit for radio frequency identification arrangements, the antenna being configured to connect to an external antenna connection of the read/write unit via an antenna line, the antenna comprising:
    a data memory having at least one of type information and property information, a content of the data memory being readable by the read/write unit;
    a directional coupler integrated into the antenna and operatively coupled to the data memory;
    a measuring device integrated into the antenna, said measuring unit determining at least one value of a field strength or power of a radio-frequency signal that is fed into the antenna by the read/write unit, said radio-frequency signal being decoupled by the directional coupler; and
    means for informing the read/write unit about the at least one value being reached or exceeded.

2. The antenna as claimed in claim 1, wherein the antenna is configured to transmit the content of the data memory and to inform the read/write unit about the at least one value being reached or exceeded via modulated backscattering based on an RFID protocol.

3. The antenna as claimed in claim 1, further comprising:
    a power sensor comprising a measuring device, the power sensor being coupled to a radio-frequency line or to a radiation element of the antenna, and the power sensor being configured and connected up such that the data memory is activated when a minimum value of the field strength or the power is reached or exceeded;
    wherein a minimum power is utilizable as the at least one value.

4. The antenna as claimed in claim 3, wherein the data memory comprises an RFID transponder
    wherein the RFID transponder is coupled to one of the radio-frequency line and the radiation element of the antenna; and
    wherein the RFID transponder is activatable by reaching or exceeding a minimum field strength or power, activation of the RFID transponder being reportable to the read/write unit as the at least one value being reached or exceeded.

5. The antenna as claimed in claim 4, wherein the RFID transponder is utilizable with a defined activation threshold as the measuring device.

6. The antenna as claimed in claim 1, wherein a level of the at least one value is at least one of stored in the data memory and ascertainable from a piece of type information that is stored in the data memory, the at least one value being transmittable to the read/write unit.

7. The antenna as claimed in claim 6, wherein the level of the at least one value comprises a threshold value or a response threshold.

8. The antenna as claimed in claim 1, wherein the antenna is configured to transmit the content of the data memory and to inform the read/write unit about the at least one value being reached or exceeded via a modulated low-frequency signal on the antenna line.

9. The antenna as claimed in claim 1, wherein the antenna is configured to transmit the content of the data memory and to inform the read/write unit about the at least one value being reached or exceeded via clocked shorting of the antenna line, the clocked shorting allowing bit-by-bit transmission of the information that is to be transmitted.

10. The antenna as claimed in claim 1, wherein at least one of the data memory and the measuring device is activatable by one of a signal received via the antenna line and a DC voltage present on the antenna line.

11. The antenna as claimed in claim 1, further comprising:
a control device configured to transmit the content of the data memory and at least one absolute value for the field strength or power of the radio-frequency signal to the read/write unit, the at least one absolute value being respectively measured by the measuring device.

12. The antenna as claimed in claim 11, wherein the control device comprises a microcontroller.

13. The antenna as claimed in patent claim 11, wherein the control device comprises the data memory.

14. A read/write unit for radio frequency identification arrangements, the read/write unit being configured to at least one of adjust a transmission power and determine a maximum transmission power based on a type or properties of an antenna including a measuring device integrated into the antenna and based on a damping of an antenna line operatively coupled to a directional coupler integrated into the antenna;
wherein the read/write unit is configured to read a piece of type or property information from the antenna and to automatically take account of the damping by receiving a piece of information about at least one value for a field strength or power of a radio-frequency signal received in the antenna including the measuring device and the directional coupler from the read/write unit being reached or exceeded and to relate the at least one value to a relative or absolute value for the radio-frequency signal output by the read/write unit, said radio-frequency signal being decoupled by the directional coupler; and
wherein the read/write unit is configured to ascertain one of a maximum transmission power and a transmission power that is to be used from the type or property information and from a relationship between the power of the output radio-frequency signal and the information about the at least one value.

15. A system comprising:
a read/write unit for radio frequency identification arrangements, the read/write unit being configured to at least one of adjust a transmission power and determine a maximum transmission power based on a type or properties of an antenna and based on a damping of an antenna line; and
an external antenna connected via a connecting line, the external antenna being configured to connect to an external antenna connection of the read/write unit via the antenna line, the external antenna comprising:
a data memory having at least one of type information and property information, a content of the data memory being readable by the read/write unit;
a directional coupler integrated into the antenna and operatively coupled to the data memory;
a measuring device integrated into the external antenna, said measuring device determining at least one value of a field strength or power of a radio-frequency signal that is fed into the antenna by the read/write unit, said radio-frequency signal being decoupled by the directional coupler; and
means for informing the read/write unit about the at least one value being reached or exceeded;
wherein the system is configured to automatically match the read/write unit to the external antenna and the antenna line;
wherein the read/write unit is configured to read a piece of type or property information from the external antenna and to automatically take account of the damping by receiving a piece of information about at least one value for a field strength or power of a radio-frequency signal received in the external antenna from the read/write unit being reached or exceeded and to relate the at least one value to a relative or absolute value for the radio-frequency signal output by the read/write unit; and
wherein the read/write unit is configured to ascertain one of a maximum transmission power and a transmission power that is to be used from the type or property information and from a relationship between the power of the output radio-frequency signal and the information about the at least one value.

16. A method for matching a read/write unit for radio frequency identification arrangements to an external antenna that is connected via a connecting line, the method comprising:
reading, by the read/write unit, at least one of a piece of type information and property information from the external antenna;
outputting, by the read/write unit, at least one radio-frequency signal and feeding the at least one radio-frequency signal into the external antenna, said radio-frequency signal being decoupled by a directional coupler;
transmitting by the external antenna a piece of information about at least one value of the radio-frequency signal captured in the external antenna being reached or exceeded to the read/write unit, a measuring device and the directional coupler being integrated into the external antenna; and
utilizing, by the read/write unit, at least one of the piece of type information and the property information from the external antenna and utilizing a relationship between a relative or absolute output power and the at least one value to perform an adjustment to achieve maximum transmission power.

17. An antenna for a read/write unit for radio frequency identification arrangements, the antenna being configured to connect to an external antenna connection of the read/write unit via an antenna line, the antenna comprising:
a data memory having at least one of type information and property information, a content of the data memory being readable by the read/write unit;
a directional coupler integrated into the antenna and operatively coupled to the data memory;
a measuring device integrated into the antenna, said measuring unit determining at least one value of a field strength or power of a radio-frequency signal that is fed into the antenna by the read/write unit, said radio-frequency signal being decoupled by the directional coupler; and
means for informing the read/write unit about the at least one value being reached or exceeded;
wherein the antenna is configured to transmit the content of the data memory via clocked shorting of the antenna line to allow bit-by-bit transmission of the information that is to be transmitted.

* * * * *